(12) United States Patent
Tanaka et al.

(10) Patent No.: US 6,524,680 B1
(45) Date of Patent: Feb. 25, 2003

(54) HONEYCOMB STRUCTURE

(75) Inventors: Minoru Tanaka, Yokohama (JP);
Masahiro Koizumi, Yokohama (JP);
Hidenori Oikawa, Yokohama (JP)

(73) Assignee: Nichias Corporation, Tokyo (JP)

( * ) Notice: Subject to any disclaimer, the term of this patent is extended or adjusted under 35 U.S.C. 154(b) by 157 days.

(21) Appl. No.: 09/709,301

(22) Filed: Nov. 13, 2000

(30) Foreign Application Priority Data

Nov. 12, 1999 (JP) ............................................. 11-322764

(51) Int. Cl.⁷ ................................................. B32B 3/12
(52) U.S. Cl. ........................ 428/116; 428/364; 428/372; 428/402; 422/177; 422/180
(58) Field of Search ................................ 428/116, 364, 428/372, 402; 422/177, 180

(56) References Cited

U.S. PATENT DOCUMENTS 4,280,926 A * 7/1981 Abe et al. .................... 252/430

FOREIGN PATENT DOCUMENTS

JP 2-187147 7/1990

* cited by examiner

*Primary Examiner*—Deborah Jones
*Assistant Examiner*—Ling Xu
(74) *Attorney, Agent, or Firm*—Nixon & Vanderhye P.C.

(57) ABSTRACT

A honeycomb structure suitable for a carrier of a catalyst apparatus is provided. The honeycomb structure includes a formed piece obtained by forming paper into a honeycomb shape. The formed piece is impregnated with inorganic oxide particles and an inorganic binder. The paper is made by mixing glass fiber and inorganic fiber which is other than the glass fiber and whose proportion of the diameter with respect to the glass fiber is 0.2 to 0.7.

10 Claims, 1 Drawing Sheet

HONEYCOMB STRUCTURE

BACKGROUND OF THE INVENTION

1. Field of the Invention

The present invention relates to a honeycomb structure used as a carrier in various catalysts for exhaust gases.

2. Description of the Related Art

In conjunction with the heightened awareness of environmental problems in recent years, keen interest has also been shown with respect to the clean-up of exhaust gases emitted from various boilers. For example, since large amounts of $NO_x$ and the like are contained in exhaust gases from an oil-fired boiler, a coal-fired boiler, and the like, a denitration apparatus is used to remove $NO_x$.

As a catalyst used in this denitration apparatus, as disclosed in JP-A-2-187147, for example, discloses a catalyst in which a carrier, which is formed by causing paper fabricated of silica-alumina or alumina ceramic fiber to be impregnated with a mixture of titania sol and silica sol and by drying and baking the impregnated paper, is made to carry vanadium oxide which is a catalyst component. In addition, a catalyst is also known in which paper fabricated of glass fiber by using an inorganic binder is made to carry a catalyst component.

However, the paper which is obtained by being fabricated of the conventional ceramic fiber or glass fiber has a limit to its thickness, and has been difficult to be formed into a thickness of 1 mm or thereabouts which is required for imparting strength, for example. In conjunction with this limitation, the held amount of a hardener such as titania or silica is small. In particular, in the case of the glass fiber, since it lacks in the water holding property, its held amount of the hardener is extremely small, and since the hardener is liable to be maldistributed, it has been necessary to increase the number of processing.

Although there is still a strong demand for increasing the throughput by raising the flow rate of the exhaust gases, the paper which is obtained from the conventional ceramic fiber or glass fiber is thin as described above, and has a small amount of the hardener, so that it cannot be said that its mechanical strength is sufficient, and deformation or breakage is liable to occur. Therefore, the situation is such that it has been unable to cope with such a demand. Furthermore, with the paper made of the glass fiber, the hardener is liable to be maldistributed in the thickness direction, so that there has been a problem in that the mechanical strength differs locally.

In addition, a fairly large amount of dust is contained in the exhaust gases from the oil-fired boiler, the coal-fired boiler, or the like, and the dust is deposited on the catalyst with declining in the catalytic efficiency. To prevent this, it is considered desirable to adopt a honeycomb structure in which the aforementioned paper formed into a corrugated cross-sectional shape, as shown in FIG. 1, is laminated in a multiplicity of stages. However, the glass fiber, in particular, has poor formability due to its rigidity and brittleness, and cracks, fractures, and the like occur, so that it has been extremely difficult to form the honeycomb structure.

Moreover, since the paper which is obtained from the conventional ceramic fiber and glass fiber holds a small amount of the hardener, as described above, the resistance against wear due to dust is also low, so that it has been necessary to replace the catalyst frequently.

SUMMARY OF THE INVENTION

The invention has been devised in view of the above-described circumstances, and the object is to provide a honeycomb structure which excels in the mechanical strength and machinability, and which is suitable for a carrier of a catalyst apparatus for exhaust gases which contain a large amount of dust particularly from an oil-fired boiler, a coal-fired boiler, or the like.

To attain the above object, the invention provides a honeycomb structure characterized in that a formed piece obtained by forming paper made by mixing glass fiber and inorganic fiber. The inorganic fiber is other than the glass fiber, and the proportion of its diameter with respect to the glass fiber is 0.2 to 0.7. The formed piece is formed into a honeycomb shape and impregnated with inorganic oxide particles and an inorganic binder.

DETAILED DESCRIPTION OF THE PREFERRED EMBODIMENTS

Figure 1:
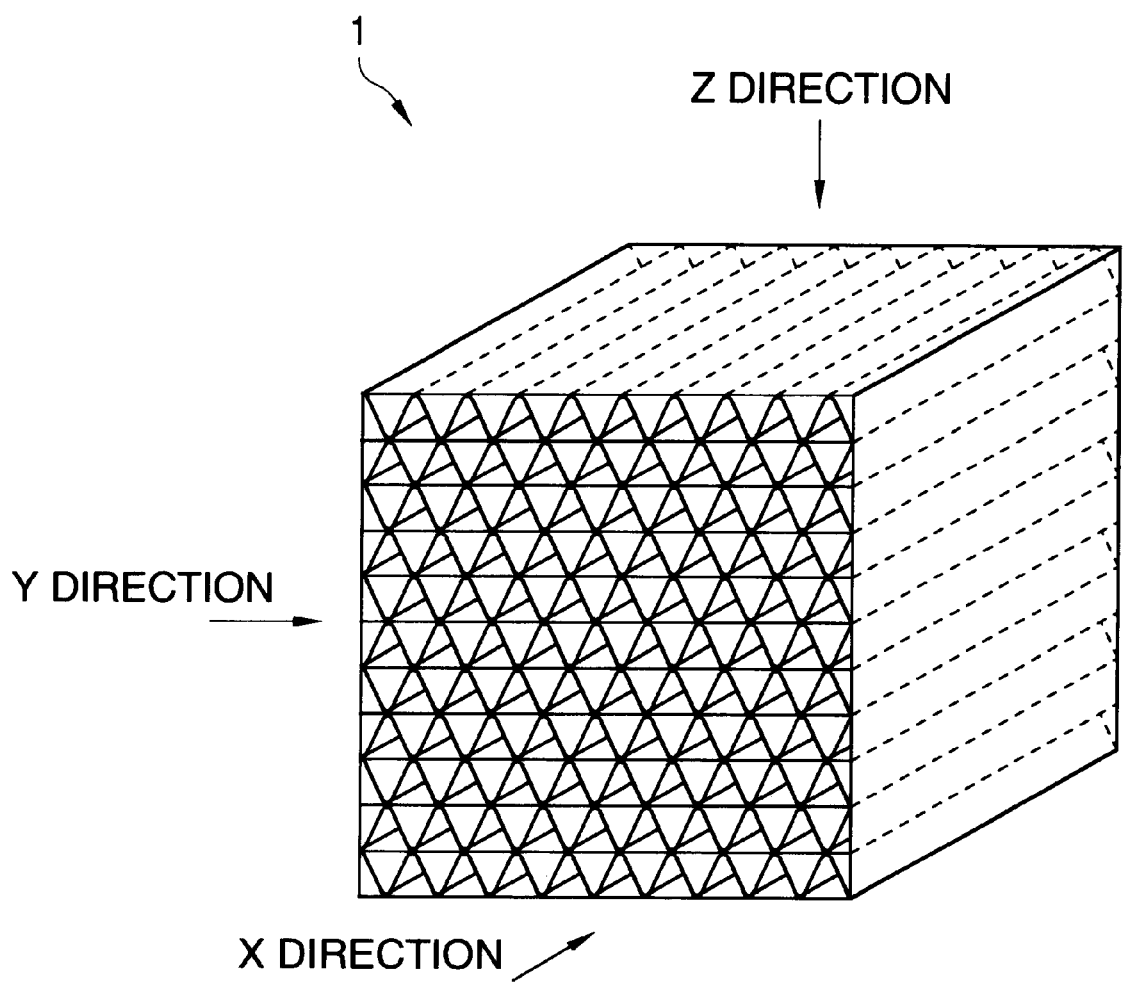
FIG. 1 is a perspective view of an example of a honeycomb structure and directions of measurement of the compressive strength in the examples.

Hereafter, a description will be given of a honeycomb structure of the invention.

The honeycomb structure in accordance with the invention is made of paper fabricated by forming paper obtained by compounding glass fiber and inorganic fiber other than the glass fiber (hereafter simply referred to as the "inorganic fiber") into a corrugated cross-sectional shape, as shown in FIG. 1, or into a trapezoidal cross-sectional shape. The formed pieces of the paper are laminated in a plurality of layers to form a honeycomb structure, which is then impregnated with inorganic oxide particles and an inorganic binder.

The diameter of the inorganic fiber is 0.2 to 0.7 with respect to the diameter of the glass fiber, preferably 0.3 to 0.5, in particular. It should be noted that the diameter of the glass fiber may be similar to that of paper made of the conventional glass fiber, and 6 to 10 $\mu$m is preferable.

The invention is based on a finding that by using glass fiber and inorganic fiber of different diameters with a specific ratio, gaps of an opening size suitable for the permeation of inorganic oxide particles and an inorganic binder are formed between the two fibers, and the inorganic oxide particles and the inorganic binder efficiently permeate deeper portions of the paper due to the capillary phenomenon through the gaps, and are held satisfactorily in the gaps. Accordingly, if the diameter of the inorganic fiber is less than 0.2 of the diameter of the glass fiber, the difference in the diameter between the two fibers is excessively large, so that it becomes difficult to hold the inorganic oxide particles and the inorganic binder in the gaps between the fibers. Meanwhile, if the diameter of the inorganic fiber exceeds 0.7 with respect to that of the glass fiber, the difference in diameter between the two fibers becomes too small, so that the gaps fail to be formed between the glass fiber and the inorganic fiber, thereby making it impossible to allow the inorganic oxide particles and the inorganic binder to permeate deep portions of the paper.

Although the kind of the inorganic fiber is not particularly limited, ceramic fibers such as silica-alumina fiber and alumina fiber are suitable, and may be used singly or in mixed form.

In addition, as for the mixing ratio between the glass fiber and the inorganic fiber, the glass fiber is preferably set to 25 to 250 parts by weight with respect to 100 parts by weight of the glass fiber. By jointly using the glass fiber and the ceramic fiber, flexibility is imparted to the paper as compared with the case where the glass fiber is singly used, and the formability at the time of formation of the honeycomb structure excels. Accordingly, if the mixing ratio becomes smaller than the above-described mixing ratio, this effect cannot be obtained. On the other hand, if the mixing ratio exceeds the above-described mixing ratio, excessive flexibility is imparted, so that the mechanical strength, the shape retaining property, and the like of the paper become deteriorated.

When the glass fiber and the inorganic fiber are compounded, a slurry fluid containing the two fibers is prepared by using water and an organic binder such as acrylic resin, and is then subjected to sheet making in accordance with a conventional process, thereby obtaining flat-shaped paper.

At that time, at a mixing ratio other than the above-described one, the proportion of either one of the glass fiber and the inorganic fiber becomes excessively large, so that the sheet making becomes close to one using the glass fiber alone or the inorganic fiber alone, so that it becomes difficult to obtain thick paper.

The obtained paper is formed into, for instance, a sinusoidal shape in terms of its cross-sectional shape by a corrugator, and is laminated in a plurality of layers, as shown in FIG. 1. Subsequently, the laminate is impregnated with inorganic oxide particles and an inorganic binder, and is then subjected to processes including drying, baking, and the like, thereby forming the honeycomb structure of the invention.

It should be noted that drying is performed at 150 to 200° C. for 30 min. to 1 hour or thereabouts, and baking is performed at 350 to 450° C. for 2 to 4 hours or thereabouts.

As the inorganic oxide particles, particles of alumina, quartzite, and kaolin are preferable, and these inorganic oxide particles may be used singly or in mixed form. In addition to these, inorganic oxide particles of mullite, zirconia, quartz sand, silica glass, and the like may be used by being mixed in. It should be noted that, in order to allow the honeycomb structure to be impregnated with the inorganic oxide particles, it suffices if the honeycomb structure is immersed in a water-based slurry of the inorganic oxide particles.

As the amount of impregnation of the inorganic oxide particles, 175 parts by weight is preferable with respect to 100 parts by weight of the paper, and the concentration of the water-based slurry and the immersion time are adjusted so as to obtain this amount of impregnation.

The honeycomb structure maybe further impregnated with particles of oxides of titanium, vanadium, tungsten, or molybdenum in addition to the inorganic oxide particles.

These particles are widely used as denitration catalysts, and in a case where the honeycomb structure of the invention is applied to the nitration catalysts, catalyzing power can be enhanced further by allowing the honeycomb structure to be impregnated with these catalyst particles together with the aforementioned inorganic oxide particles and by allowing the honeycomb structure to hold them.

As the amount of impregnation of these particles, 200 parts by weight is preferable with respect to 100parts by weight of the paper, and the concentration of the water-based slurry and the immersion time are adjusted so as to obtain this amount of impregnation.

As the inorganic binder, silica sol, alumina sol, and titania sol are preferable, and these inorganic binders may be used singly or in mixed form. In addition, the solid content in the sol or sols is preferably 20 to 30%.

It should be noted that, in order to allow the honeycomb structure to be impregnated with the inorganic binders, it suffices if the honeycomb structure is immersed in the aforementioned sols. As the amount of impregnation of the inorganic binder or binders, 210 parts by weight is preferable with respect to 100 parts by weight of the paper, and the solid content of the sol and the immersion time are adjusted so as to obtain this amount of impregnation.

In the honeycomb structure of the invention thus obtained, since the inorganic oxide particles, the inorganic binder, and the catalysis particles efficiently permeate deeper portions of the paper through the gaps formed between the glass fiber and the inorganic fiber, the amounts of inorganic oxide particles and catalysis particles held are large as compared with the paper made of the conventional ceramic fiber alone or glass fiber alone, so that the mechanical strength and the wear resistance are improved drastically.

Hereafter, the invention will be described more clearly by citing examples and comparative examples.

EXAMPLE 1

After 30 parts by weight of E glass (average diameter: 13.0 $\mu$m) and 70 parts by weight of alumina fiber (average diameter: 2.8 $\mu$m) were dispersed in water, sheet was made by using a paper machine in accordance with a conventional process, thereby obtaining 1.5-mm-thick paper. The obtained paper was formed into a sinusoidal cross-sectional shape by using a corrugator, and formed pieces thus obtained were laminated in a multiplicity of stages, thereby obtaining a honeycomb structure such as the one shown in FIG. 1.

Next, after this honeycomb structure was immersed in a hardening solution (a slurry with quartzite mixed with silica sol) and was then dried at 170° C. for 45 min., the honeycomb structure was baked at 400° C. for 1 hour to harden. Then, this honeycomb structure was impregnated with titania sol (the solid content of titania: 30%), and after being dried at 170° C. for 30 min., the honeycomb structure was subjected to heat treatment at 400° C. for 1 hour. Further, this honeycomb structure was immersed in a mixed solution of ammonium metavanadate and ammonium metatungstate, was then dried at 170° C. for 30 min., and was further subjected to heat treatment at 400° C. for 3 hours, thereby obtaining a denitration catalyst.

EXAMPLE 2

After 70 parts by weight of E glass (average diameter: 9.0 $\mu$m) and 30 parts by weight of silica-alumina fiber (average diameter: 3.0 $\mu$m) were dispersed in water, sheet was made by using the paper machine in accordance with the conventional process, thereby obtaining 0.9-mm-thick paper. The obtained paper was formed into a sinusoidal cross-sectional shape by using the corrugator, and formed pieces thus obtained were laminated in a multiplicity of stages, thereby obtaining a honeycomb structure such as the one shown in FIG. 1.

Next, a denitration catalyst was obtained by operation similar to that in Example 1.

EXAMPLE 3

After 70 parts by weight of E glass (average diameter: 5.0 $\mu$m) and 30 parts by weight of silica-alumina fiber (average diameter: 3.5 $\mu$m) were dispersed in water, sheet was made by using the paper machine in accordance with the conventional process, thereby obtaining 0.8-mm-thick paper. The obtained paper was formed into a sinusoidal cross-sectional shape by using the corrugator, and formed pieces thus obtained were laminated in a multiplicity of stages, thereby obtaining a honeycomb structure such as the one shown in FIG. 1.

Next, a denitration catalyst was obtained by operation similar to that in Example 1.

COMPARATIVE EXAMPLE 1

After 70 parts by weight of E glass (average diameter: 20.0 μm) and 30 parts by weight of alumina fiber (average diameter: 2.0 μm) were dispersed in water, sheet was made by using the paper machine in accordance with the conventional process, thereby obtaining 2.0-mm-thick paper. Although formation was attempted by subjecting the obtained paper to the corrugator, it was not possible to effect formation.

COMPARATIVE EXAMPLE 2

After 70 parts by weight of E glass (average diameter 4.0 μm) and 30 parts by weight of silica-alumina fiber (average diameter: 4.0 μm) were dispersed in water, sheet was made by using the paper machine in accordance with the conventional process, thereby obtaining 0.5-mm-thick paper. The obtained paper was formed into a sinusoidal cross-sectional shape by using the corrugator, and formed pieces thus obtained were laminated in a multiplicity of stages, thereby obtaining a honeycomb structure such as the one shown in FIG. 1.

Next, a denitration catalyst was obtained by operation similar to that in Example 1.

COMPARATIVE EXAMPLE 3

Paper made of silica-alumina fiber and having a thickness of 0.4 mm was formed into a sinusoidal cross-sectional shape by using the corrugator, and formed pieces thus obtained were laminated in a multiplicity of stages, thereby obtaining a honeycomb structure such as the one shown in FIG. 1.

Next, after this honeycomb structure was immersed in a hardening solution (silica sol (solid content: 30%)) and was then dried at 170° C. for 45 min., the honeycomb structure was baked at 400° C. for 1 hour to harden. Then, this honeycomb structure was impregnated with titania sol (the solid content of titania: 30%), and after being dried at 170° C. for 30 min., the honeycomb structure was subjected to heat treatment at 400° C. for 1 hour. Further, this honeycomb structure was immersed in a mixed solution of ammonium metavanadate and ammonium metatungstate, was then dried at 170° C. for 30 min., and was further subjected to heat treatment at 400° C. for 3 hours, thereby obtaining a denitration catalyst.

COMPARATIVE EXAMPLE 4

When coated paper in which E glass paper having a thickness of 0.7 mm was coated with 100 g/m² of clay was formed into a sinusoidal cross-sectional shape by using the corrugator, many cracks and fractures occurred in the formed pieces thus obtained. These formed pieces were laminated in a multiplicity of stages, thereby obtaining a honeycomb structure such as the one shown in FIG. 1.

Next, a denitration catalyst was obtained by operation similar to that in Comparative Example 3.

With respect to each denitration catalyst fabricated as described above, evaluation was made of corrugation processing suitability and compressive strength. Each evaluation method is described below, and the results are shown in Table 1.

(Evaluation of Corrugation Processing Suitability)

With respect to each paper made as described above, the corrugation processing suitability was judged from the formability, shape stability, and the like at the time when the paper was processed into a sinusoidal cross-sectional shape by using the corrugator. In the table, "⊚" indicates the highest suitability, followed by "○", "Δ," and "X" in that order.

(Compressive Strength Test)

Each nitration catalyst (excluding Comparative Example 1) was cut into cubes whose one side was 100 mm, and the cut cubes were used as specimens. The compressive strength was measured with respect to the x direction, y direction, and z direction shown in FIG. 1. The measurement was effected under the conditions of a crosshead speed of 5 mm/min. and a chart speed of 25 mm/min. by using UTM-10T-type compression testing machine (made by TOYO BALDWIN CO., LTD.) and by using a 49, 000N load cell.

TABLE 1

| | Fiber Diameter Ratio* | Paper Thickness (mm) | Corrugation Processing Suitability | Compressive Strength (N/cm²) | | | Remarks |
|---|---|---|---|---|---|---|---|
| | | | | x direction | y direction | z direction | |
| Example 1 | 0.2 (2.8/13) | 1.5 | Δ | 196 | 29.4 | 24.5 | |
| Example 2 | 0.33 (3/9) | 0.9 | ⊚ | 245 | 39.2 | 24.5 | |
| Example 3 | 0.7 (3.5/5) | 0.8 | ○ | 98 | 19.6 | 9.8 | |
| Comparative Example 1 | 0.1 (2/20) | 2.0 | X | — | — | — | corrugation processing impossible |
| Comparative Example 2 | 1.0 (4/4) | 0.5 | ○ | 39.2 | 9.8 | 4.9 | lack of strength |
| Comparative Example 3 | FF only | 0.4 | ⊚ | 19.6 | 2.94 | 0.98 | lack of strength |
| Comparative Example 4 | glass paper only | 0.7 | Δ~X | 98 | 19.6 | 5.88 | unsuitable for corrugation processing |

*(diameter (μm) of alumina fiber or silica-alumina fiber) / (diameter (μm) of glass fiber)

As shown in Table 1, it can be seen that the paper of the examples obtained by compounding glass fiber and inorganic fiber with a specific diameter ratio can be made thicker than the paper of the comparative examples, and that the paper of the examples has flexibility, and its suitability for corrugation processing is high.

In addition, the paper of the examples has high compressive strength, and this is presumably due to the fact that the inorganic oxide particles and the inorganic binder permeated the deep portions in large quantities, and that they are held uniformly over the entire paper without being maldistributed.

As described above, in accordance with the invention, it is possible to obtain a honeycomb structure which excels in the mechanical strength and wear resistance, and which is suitable for a carrier of a catalyst apparatus for exhaust gases which contain a large amount of dust particularly from an oil-fired boiler, a coal-fired boiler, or the like.

While only certain examples of the invention have been specifically described herein, it will be apparent that numerous modifications may be made thereto without departing from the spirit and scope of the invention.

What is claimed is:

1. A honeycomb structure comprising:
    a formed piece of corrugated or trapezoidal paper formed into a honeycomb shape, the paper made of glass fiber and inorganic fiber, the inorganic fiber being other than glass fiber, and the ratio of the diameter of the inorganic fiber is 0.2 to 0.7 to the diameter of the glass fiber,
    wherein said formed piece is impregnated with inorganic oxide particles and an inorganic binder.

2. The honeycomb structure according to claim 1, wherein the inorganic fiber is silica-alumina fiber, alumina fiber or both.

3. The honeycomb structure according to claim 1, wherein the inorganic oxide particles are alumina, quartzite, kaolin or mixtures thereof.

4. The honeycomb structure according to claim 1, wherein the formed piece also includes particles of oxides of titanium, vanadium, tungsten, or molybdenum or mixtures thereof.

5. The honeycomb structure according to claim 1, wherein the ratio of the diameter of the inorganic fiber is 0.3 to 0.5 to the diameter of the glass fiber.

6. A catalyst structure for catalytically treating exhaust gases having a honeycomb structure comprising:
    a formed piece of corrugated or trapezoidal paper formed into a honeycomb shape, the paper made of glass fiber and inorganic fiber, the inorganic fiber being other than the glass fiber, and the ratio of the diameter of the inorganic fiber is 0.2 to 0.7 to the diameter of the glass fiber,
    wherein said formed piece is impregnated with inorganic oxide particles, catalyst particles and an inorganic binder.

7. The catalyst structure according to claim 6, wherein the inorganic fiber is silica-alumina fiber, alumina fiber or a mixture thereof.

8. The catalyst structure according to claim 6, wherein material of the inorganic oxide particles are alumina, quartzite, kaolin or mixtures thereof.

9. The honeycomb structure according to claim 6, wherein the catalyst particles are oxides of titanium, vanadium, tungsten, molybdenum or mixtures thereof.

10. The honeycomb structure according to claim 6, wherein the ratio of the diameter of the inorganic fiber is 0.3 to 0.5 to the diameter of the glass fiber.

* * * * *